Patented May 15, 1945

2,376,264

UNITED STATES PATENT OFFICE 2,376,264

COMPOSITIONS FROM VULCANIZABLE GUMS AND MAKING SAME

George D. Martin, Nitro, W. Va., assignor to Monsanto Chemical Company, St. Louis, Mo., a corporation of Delaware No Drawing. Application July 23, 1940, Serial No. 346,991

18 Claims. (Cl. 260—768)

This invention relates to new plastic products derived from vulcanizable natural gums and to the preparation of the same.

In accordance with this invention a vulcanizable natural hydrocarbon gum which for convenience will be referred to hereinafter as rubber, is treated with an organic phosphine halide belonging to the aromatic series of compounds. While the aromatic radical or radicals include radicals in which carbon is linked to phosphorus through an intermediary such as oxygen, sulfur, nitrogen, methylene and the like, it is preferred to employ a phosphine halide in which a carbon atom of an aromatic radical is attached directly to phosphorus. Of the halides, the chlorides, due to their cheapness and availability are preferred.

Any aromatic phosphine halide is suitable for the preparation of the new plastic and elastic products. As typical examples there may be mentioned the following but the invention is by no means limited thereto: phenyl dichlor phosphine, thiophendichlor phosphine, tolyl dichlor phosphine, 1,3,4 trimethyl phenyl dichlor phosphine, 1,3,5 trimethyl phenyl dichlor phosphine, xylyl dichlor phosphine, biphenyl dichlor phosphine, α naphthyl dichlor phosphine, tetrahydro naphthyl dichlor phosphine, dichlor phosphine of meta diphenyl benzene, decyl phenyl dichlor phosphine, diethyl amino phenyl dichlor phosphine, dimethyl amino phenyl dichlor phosphine, tertiary butyl phenyl dichlor phosphine, ditolyl chlor phosphine, dixylyl chlor phosphine, tolyl dibrom phosphine, α naphthyl dibrom phosphine, tolyloxy dichlor phosphine, α naphthoxy dichlor phosphine, benzyl dichlor phosphine, phosphazobenzol chloride, diphenyl amino dichlor phosphine, thiophenyl dichlor phosphine, anisyl dichlor phosphine, phenetyl dichlor phosphine, meta and para hydroxy dichlor phosphine, chlor phenyl dichlor phosphine, bromphenyl dichlor phosphine, ethyl phenyl dichlor phosphine, dibenzyl dichlor phosphine, diphenyl methane dichlor phosphine and equivalents and analogues thereof.

The aromatic phosphine halides are a well known class of compounds so that reference may be had to the literature for the various methods available for their preparation. Such methods comprise reacting a phosphorus trihalide with a phenol, a thio phenol, an aromatic amine, aromatic hydrocarbon, etc. In the case of the preferred group wherein the phosphorus atom is linked directly to a carbon atom of an aryl group possible methods of synthesis comprise treating a diaryl mercury with $PCl_3$ or reacting a suitable aromatic compound with $PCl_3$ in the presence of a Friedel-Crafts catalyst.

As will appear presently there are certain advantages derived from employing a Friedel-Crafts synthesis. Reference may be had to Liebig's Annalen, vol. 212, p. 205–8, p. 236 and vol. 294, pages 2, 35 and 48, for further details. A description of the use of aromatic tertiary amines in the process may be found in Ann. 260, p. 34. However, it is to be understood that this invention is not limited to any particular method of making the organic phosphine halides.

Although it is not possible to state the nature of the change taking place upon treating rubber with a phosphine halide other than by reference to the physical properties of the final products; that the products are reaction products of rubber is indicated by the fact that the hydrocarbon content of the original rubber is materially increased. The properties of the final product depend upon the reaction conditions, the proportion of reacting ingredients and the like. Thus, the conditions may be varied so as to obtain products ranging from sticky viscous plastics to hard somewhat brittle products possessing limited elasticity. Among the most interesting and useful type of products are very tough rubbery materials. While products answering this description are obtainable from aromatic phosphine halides broadly products derived from phosphine halides in which phosphorus is attached to a carbon atom of an aryl group, in general exhibit greater stability.

There are numerous ways and means of effecting the reaction between rubber and the phosphine halide. It is even possible to treat rubber with a phosphine halide formed in situ but the reaction is then much more difficult to control and consequently the products are less easily reproduced. In general while it is desired to emphasize that the particular apparatus employed, the presence or absence of inert solvent, the temperature, time and the like are not critical in the sense of obtaining products within the scope of this invention although as noted these factors will influence the properties of the product, it is essential that the rubber be brought into intimate and uniform association with the phosphine halide if it is expected to get reproducible results. To this end use of inert solvents is of considerable benefit but their elimination is of course desirable for reasons of economy. In the absence of a solvent the phosphine halide tends to make the rubber slimy and slippery during the early stages of the treatment so that thorough mixing is impeded. However, an efficient internal type mixer composed of corrosion resistant material such as stainless steel will give the proper association of the reactants. This may be of the W. & P. type or modifications thereof. A Banbury mixer is a further example of a suitable mixing apparatus. In any case there should be little or no free space above the mixer blades. Use of well broken down rubber will further facilitate the reaction. An ordinary rubber mill may be used but it is then necessary either to enclose the rolls and pass dry air or other dry inert gas through the enclosure or to work in a room of controlled low humidity in order to avoid undue hydrolysis of the phosphine halide. The latter should be added slowly until the slippery stage has passed after which the remainder may be added at a fairly rapid rate. In addition the bath size should be kept well below that which could normally be employed in milling rubber alone. Tight rolls and a small bank both aid the mixing. Finally it should not be inferred from the above that it is necessary to tie up expensive equipment for the duration of the reaction. Once the rubber and the phosphine halide have been thoroughly mixed so that the mass is homogeneous throughout it may be removed and placed in an ordinary oven to complete the reaction. However it should be remembered that some hydrogen chloride will be evolved so that precautions against corrosion are advisable.

While not necessarily essential the reactions are greatly facilitated by the incorporation of a small proportion of a Friedel-Crafts catalyst. In the case of phosphine halides involving a Friedel-Crafts synthesis in their preparation it has been found satisfactory and in fact advantageous to use the entire reaction mixture which of course already contains a catalyst so that additional catalyst is unnecessary, although more may be added where desired. However a certain amount of unreacted ingredients are ordinarily separated before reacting with the rubber. After heating liquid aromatic hydrocarbons as for example xylene or toluene with a phosphorus trihalide in the presence of a Friedel-Crafts catalyst there separates after completion of the reaction a top layer consisting essentially of unreacted hydrocarbon and phosphorus halide which is simply drawn off and reserved for future preparations. The bottom layer contains the desired reaction product together with small proportions of unreacted materials, products from side reactions and most of the catalyst, the latter existing in the form of a complex organic addition product. It has been found that this crude mixture remaining after separation of the layer of unreacted materials is admirably suited for reacting directly with rubber without further treatment. This so called "bottom layer" will be designated hereinafter as "crude" reaction product. By way of example a typical preparation of crude tolyl dichlor phosphine is given below:

Into a suitable glass or glass lined reaction vessel fitted with a reflux condenser there was charged 600 parts by weight of toluene, 800 parts by weight of PCl₃ and 120 parts by weight of anhydrous aluminum chloride. The mixture was then heated to refluxing temperature at which temperature it was maintained for about 36 hours. HCl was evolved during the greater part of the heating. When cool the reaction mixture separated into two portions. The bottom layer amounting to substantially 840 parts by weight was drawn off and either immediately reacted with rubber or stored in moisture proof containers. In this connection tolyl dichlor phosphine and analogous materials are extremely sensitive to moisture and hydrolyze rapidly to the corresponding acids. Contact with moisture should therefore be avoided at all times especially since the hydrolysis products do not react with rubber. Surprisingly however, the presence of small amounts of water during the reaction with rubber are not deleterious. For example crude tolyl phosphine dichloride has been successfully reacted with rubber employing as a solvent toluene saturated with water. No difference could be detected between the product obtained and that obtained employing anhydrous toluene. In addition to the obvious advantages attending the use of the crude bottom layer the further surprising discovery has been made that the rubbery products prepared therefrom are tougher and stronger than products prepared from pure distilled phosphine halides.

Obviously, aromatic compounds which are normally solids will not separate as an unreacted liquid layer so that instead of using the entire bottom layer the phosphine halide is preferably extracted from the crude reaction mixture by a suitable solvent such as petroleum ether, the solvent removed and the residue reacted with rubber. Further purification serves no useful purpose. However, in this case it is necessary to add a small proportion of Friedel-Crafts catalyst to promote the reaction with rubber. Unless otherwise indicated the phosphine halides belonging to the preferred group in which carbon is linked to phosphorus will be understood hereinafter to be the products extracted from the Friedel-Crafts reaction by a suitable solvent, usually petroleum ether and remaining after removal of the solvent.

The following specific examples will illustrate the invention in detail and are to be understood as descriptive and explanatory but not limitative of the invention.

*Example I*

A rubber cement was prepared by dissolving 200 parts by weight of pale crepe rubber in substantially 3000 parts by weight of carbon bisulfide or other inert solvent. Into the cement so prepared contained in a suitable vessel fitted with a reflux condenser and stirring mechanism there was stirred substantially 50 parts by weight of crude tolyl dichlor phosphine followed by substantially two parts by weight of anhydrous aluminum chloride. Heat was then applied and the mixture stirred and heated at refluxing temperature for about 48 hours after which a Liebig type condenser was substituted for the reflux condenser and the solvent removed by distillation. When distillation had substantially ceased a moderate vacuum was applied and the temperature allowed to rise at will on a steam or boiling water bath until solvent no longer distilled. The product which remained was thoroughly washed with water, either on an ordinary rubber mill or on a mill having corrugated rolls or on other equipment adapted for washing tough plastic products. The washed product was dried by milling on a hot mill as for example at 70° C. followed by heating to constant weight in a vacuum oven at 60–75° C. In this manner there was obtained substantially 227 parts by weight of a tough rubber like product possessing desirable modulus and tensile properties.

*Example II*

Substantially 500 parts by weight of toluene, 660 parts by weight of PCl₃ and 120 parts by weight of anhydrous aluminum chloride were charged into a suitable reaction vessel fitted with a reflux condenser and heated at refluxing temperature for about 36 hours. From 1700-1800 parts by weight of toluene and about 4.5 parts by weight of water were then added and the mix allowed to stand for 12 hours or until two layers separated after which the lower layer was drawn off and again extracted with toluene. The toluene extracts were combined and the toluene removed, preferably by distillation. The residue, a clear amber liquid, comprising the desired tolyl dichlor phosphine was reserved for use in the preparation of products of this invention.

75 parts by weight of the above tolyl dichlor phosphine, 300 parts by weight of pale crepe rubber, 300 parts by weight of carbon bisulfide or other inert solvent and 6 parts by weight of anhydrous aluminum chloride were charged into an internal type mixer of suitable capacity composed of stainless steel or other corrosion resistant material. The charge was mixed for 18 hours at about 50° C. during which time substantially all of the solvent and a considerable volume of hydrogen chloride were driven from the reaction. Water was then added and the product washed as completely as possible before removing from the mixer. After taking the batch from the mixer washing was completed on a mill and the product dried substantially as described in Example I to obtain 346.5 parts by weight of a tough rubber like product possessing a tensile strength of about 3500 pounds per square inch and an elongation of 615%.

The use of a solvent is unnecessary if an efficient mixing apparatus is employed. For example 300 parts by weight of pale crepe rubber and 75 parts by weight of crude tolyl dichlor phosphine were intimately associated in an internal type mixer of suitable capacity. 5 parts by weight of anhydrous aluminum chloride were added in three portions over a period of four hours to the well masticated charge at about 46° C. Heating at this temperature and mixing was continued for another four hour period after which water was added and the product washed and dried all substantially as described above to obtain 337 parts by weight of a tough rubbery product.

*Example III*

300 parts by weight of pale crepe rubber, 500 parts by weight of carbon bisulfide, 75 parts by weight of xylyl dichlor phosphine and 4 parts by weight of anhydrous aluminum chloride were charged into a stainless steel mixer of suitable capacity. The mass was mixed at about 47° C. for a period of aproximately twenty-five hours after which the solvent was removed and the product washed and dried all substantially as described in Example I to obtain 325 parts by weight of a rubber like product.

*Example IV*

Substantially 75 parts by weight of diphenyl dichlor phosphine was substituted for the xylyl phosphine dichloride in the charge and procedure described in Example III above. 370 parts by weight of a rubber like product were obtained.

*Example V*

240 parts by weight of pale crepe rubber, 60 parts by weight of alpha naphthyl dichlor phosphine, 500 parts by weight of carbon bisulfide and 4 parts by weight of anhydrous aluminum chloride were charged into a stainless steel mixer of suitable capacity. The mass was kneaded for substantially a 36 hour period at about 47° C. and the solvent removed by distillation or other means after which the residue was washed and dried all substantially as described in Example II to obtain 271 parts by weight of a rubber like product.

*Example VI*

A rubber cement was prepared by dissolving 100 parts by weight of pale crepe rubber in about 15 times its weight of carbon bisulfide in a suitable glass or glass lined vessel fitted with a reflux condenser and stirrer. Substantially 50 parts by weight of tetrahydro naphthalene dichlor phosphine and 2 parts by weight of anhydrous aluminum chloride were added thereto. The mixture was then heated to refluxing at which temperature it was maintained for 48 hours after which the solvent was removed and the product worked up all substantially as described in Example I to obtain after the washing and drying, 134 parts by weight of a rubber like product.

*Example VII*

In a similar manner the dichlor phosphine of meta diphneyl benzene was reacted with crepe rubber. To a carbon bisulfide rubber cement containing 100 parts by weight of rubber there was added 50 parts by weight of the dichlor phosphine of m-diphenyl benzene and 5 parts by weight of anhydrous aluminum chloride. The reaction was carried out and the product isolated all substantially as in Example VI to obtain 129 parts by weight of a tough rubber like product.

*Example VIII*

Substituting 50 parts by weight of decyl phenyl dichlor phosphine for the m-diphenyl benzene phosphine dichloride in Example VII, substantially 125 parts by weight of a rubber like product was obtained.

*Example IX*

Into a suitable glass or glass lined container fitted with a reflux condenser there was charged a solution of 100 parts by weight of pale crepe rubber in substantially 1500 parts by weight of carbon bisulfide, 50 parts by weight of crude tolyl dichlor phosphine and 2 parts by weight of anhydrous aluminum chloride. The mix was heated to refluxing at which temperature it was maintained for about 48 hours, after which the solvent was removed and the product washed and dried all substantially as described in Example I to obtain a white very tough rubbery somewhat fibrous product. The average yield over a considerable number of similar preparations was about 121.7 parts by weight.

*Example X*

As illustrative of the preparation in the absence of a solvent of products similar to those of Example IX, 200 parts by weight of pale crepe rubber were well broken down or plasticized in a stainless steel internal type mixer by masticating at about 100° C. To the rubber so prepared and at 100° C. substantially 100 parts by weight of crude tolyl dichlor phosphine were added over a period of an hour. Heating and mixing were continued for about 9 hours after which the heat and power were cut off. When cool, water was added and the product washed and dried all substantially as described in Example II to obtain a plastic elastic material possessing properties similar to those of the products of Example IX.

Example XI 200 parts by weight of rubber were masticated at 100° C. in an internal type stainless steel mixer. To the well broken down crepe rubber there was added over a period of about an hour and at 100° C. substantially 150 parts by weight of crude tolyl dichlor phosphine. The heating and mixing were continued for 4 hours after which water was added and the product washed and dried all substantially as described in Example II to obtain a tough plastic and elastic material. The average yield of a large number of similar preparations was 255.8 parts by weight.

Example XII

In another series of preparations in which the operation was substantially the same as described in the foregoing example (XI) the proportion of crude tolyl dichlor phosphine was increased 175 parts by weight per 200 parts by weight of rubber. In this case the average yield was 262.2 parts by weight and the products were in every case tough and rubber like. In some of the preparations varying proportions of toluene up to about three fourths the weight of the rubber were added as solvent. While this expedient improved and aided the handling and washing of the products the final products were quite the same as where no solvent was employed.

Example XIII

Following the general procedure of Example XI and XII a reaction was effected between 200 parts by weight of crepe rubber and 200 parts by weight of crude tolyl dichlor phosphine. After washing and drying there was obtained 268 parts by weight of a tough rubber like material.

Example XIV

A rubber cement was prepared by dissolving 500 parts by weight of pale crepe rubber in carbon bisulfide. To the solution of rubber contained in a suitable glass or glass lined vessel fitted with a reflux condenser and stirrer there was added 150 parts by weight of tolyl oxy dichlor phosphine (another name would be cresoxy dichlor phosphine). The mass was stirred until a homogeneous solution was formed and then heated to refluxing temperature for substantially 12 hours after which the solvent was removed and the residue washed and dried all substantially as described in Example I. The yield was 600 parts by weight of a neutral colored rubber like product which possessed good modulus and tensile properties and took up compounding ingredients better than rubber. For example, the following stocks were compounded

|  | Stock | |
|---|---|---|
|  | A | B |
| Product of above Example XIV | 100 | 100 |
| Carbon black | 50 |  |
| Zinc oxide | 10 | 10 |
| Stearic acid | 3 | 0.5 |
| Benzothiazyl thiobenzoate | 3 |  |
| Diphenyl guanidine | 0.1 | 0.15 |
| Sulfur | 3 | 3 |
| Di(benzothiazyl thiol) dimethyl urea |  | 0.6 |

The A stock cured in 15 minutes at 287° F. and possessed a tensile strength ranging from 3400 to 3600 pounds per square inch. The optimum cure was about 45 minutes.

The B stock cured in 30 minutes at 247° F. and possessed a tensile strength of about 3200 pounds per square inch at the optimum cure of about 45 minutes.

Example XV

Into an internal type mixer composed of stainless steel or other acid resistant material there were charged 300 parts by weight of pale crepe rubber, about an equal proportion by weight of carbon bisulfide, 75 parts by weight of α napthoxy dichlor phosphine and 4 parts by weight of aluminum chloride. A reflux condenser was inserted into the system through an opening in the mixer cover especially adapted for such purpose. The condenser served both as a vent for escaping gasses and as a condenser for the solvent. The contents of the mixer were heated to refluxing temperature for about 16 hours during which time the mixer blades were kept in motion so as to assure thorough and complete mixing. The solvent was then removed by any suitable means such as distillation and the residue washed and dried as hereinabove described to obtain 341.5 parts by weight of a light gray rubber like product which could be treated and handled in much the same manner as rubber. For example a stock composed of 150 parts of the above material, 15 parts of zinc oxide, 7.5 parts of benzothiazyl thiobenzoate and 4.5 parts of sulfur, the parts being by weight, compounded and sheeted very nicely. Furthermore, the compounded stock was found to possess toughness and durability to an exceptional degree.

Example XVI

Into a suitable glass or glass lined container fitted with a reflux condenser and stirrer there was charged a solution of 100 parts by weight of guayule rubber in substantially 1500 parts by weight of carbon bisulfide, 50 parts by weight of crude tolyl dichlor phosphine and 2 parts by weight of anhydrous aluminum chloride. The mix was heated and stirred at refluxing temperature for about 48 hours after which the solvent was removed and the product washed and dried all substantially as described in Example I to obtain substantially 134 parts by weight of a soft rubbery product.

Example XVII

Into a suitable glass or glass lined container fitted with a reflux condenser and stirrer there was charged a solution of 100 parts by weight of gutta percha in substantially 1500 parts by weight of carbon bisulfide, 50 parts by weight of crude tolyl dichlor phosphine and 2 parts by weight of anhydrous aluminum chloride. The mix was heated and stirred at refluxing temperature for about 48 hours after which the solvent was removed and the product washed and dried all substantially as described in Example I to obtain 117 parts by weight of a product which knit together and handled very nicely on a rubber mill. This product was considerably tougher than gutta percha. A stock composed of 100 parts by weight of this product, 10 parts zinc oxide, 5 parts sulfur, 1 part di(benzothiazyl thiol) dimethyl urea and 0.25 part diphenyl guanidine (all parts are by weight) gave a good cure when heated in a press for thirty minutes at the temperature of 40 pounds of steam pressure per square inch. The cured stock exhibited a hardness of 67 on a Shore durometer, type "A" as compared to a hardness of 33 of a similarly cured stock prepared from gutta percha.

Example XVIII

Into a suitable glass or glass lined container fitted with a reflux condenser and stirrer there was charged a solution of 100 parts by weight of balata in substantially 1500 parts by weight of crude tolyl dichlor phosphine and 2 parts by weight of anhydrous aluminum chloride. The mix was heated and stirred at refluxing temperature for about 48 hours after which the solvent was removed and the product washed and dried all substantially as described in Example I to obtain 120.5 parts by weight of a tough rubbery product possessing for many purposes, properties superior to balata. 100 parts by weight of this product compounded with 5 parts zinc oxide, 12 parts sulfur, 0.8 part di(benzothiazyl thiol) dimethyl urea and 0.2 part diphenyl guanidine (all parts are by weight) gave a good cure in 30 minutes at the temperature of 40 pounds of steam pressure per square inch. The cured stock exhibited a hardness of 75 on a Shore durometer, type "A" as compared to a hardness of 28 of a similarly cured stock prepared from balata.

*Example XIX*

Into a suitable glass or glass lined container fitted with a reflux condenser and stirrer there was charged a solution of 100 parts by weight of pale crepe rubber in substantially 1500 parts by weight of carbon bisulfide, 50 parts by weight of crude tolyl dichlor phosphine, 1 part by weight of sulfur and 2 parts by weight of anhydrous aluminum chloride. The mix was heated and stirred at refluxing temperature for about 48 hours after which the solvent was removed and the product washed and dried all substantially as described in Example I to obtain 122 parts by weight of a tough rubber like product similar to that of Example I. It is thus apparent that admixtures of rubber and sulfur are suitable for reacting in the manner herein described. Furthermore, it has been found that reclaimed rubber may be reacted with a phosphine halide. For example tube reclaim was reacted with crude tolyl dichlor phosphine following substantially the procedure of Example I.

Where a catalyst such as aluminum chloride is to be added either to a rubber cement or to rubber directly, it is preferred to add it to the phosphine halide and then add the resulting mixture to the rubber or rubber cement. In this manner a more complete dispersion of the catalyst is effected. The reaction between phosphine halides and rubber takes place over a considerable range of temperatures. Thus, very satisfactory reactions have been carried out over a period of about 48 hours where the temperature was carefully controlled at about 47° or below throughout the entire period in which the phosphine halide was in contact with the rubber. At higher temperatures, as for example up to about 140° C., the time necessary for reaction becomes increasingly shorter but at temperatures much in excess of 100° C. it is rather difficult to control the reactions so as to obtain reproducible results.

The products of this invention have numerous industrial applications. In general they may be employed as substitutes for natural rubbers and in addition due to their light color and great toughness coupled with good elastic properties may be employed for purposes for which natural rubbers are inapplicable. For example ordinary hard rubber is utilizable only where a black color is permissible but many applications of a product possessing the physical properties of hard rubber require light colored and pigmented products. Products of this invention by suitable compounding may be manufactured into white and colored products otherwise possessing physical properties similar to hard rubber. The following example illustrates such a composition. A rubber base stock was compounded comprising

| | Parts by weight |
|---|---|
| Product of Example IX | 100 |
| Zinc oxide | 10 |
| Rayox #10 | 10 |
| Whiting | 60 |
| Sulfur | 3 |
| Di(benzothiazyl thiol) dimethyl urea | 1 |
| Diphenyl guanidine | 0.25 |
| Paraffin | 0.5 |

To the base stock so compounded there were added the following pigments:

| Stock | Pigment | Parts by weight |
|---|---|---|
| C | Rayox #10 | 10 |
| D | Blue #15 | 1.8 |
| E | Green #2000 | 1.8 |
| F | Yellow #14 | 3.6 |
| G | Red #328 | 1.8 |

The stocks so compounded were cured by heating for 15 minutes at the temperature of 40 pounds steam pressure per square inch. The cured rubber products exhibited a hardness of 100 points on a Shore durometer, type "A" hardness gauge and colors as indicated, stock C being a good clear white. It was further found that the colors as well as the hardness were substantially unaffected by aging for 93 hours at 70° in an oxygen bomb under 300 pounds oxygen pressure per square inch. However, a slight fading of the blue in stock D and a slight darkening of the white stock C were just perceptible.

The following are exemplary of the use of the preferred materials as a substitute for rubber in a conventional rubber stock. Compositions adapted for use as the tread portions of rubber tires were compounded comprising

| | Stock | |
|---|---|---|
| | H | J |
| Smoked sheets of rubber | 100 | |
| Product of Example I | | 100 |
| Carbon black | 40 | 40 |
| Zinc oxide | 5 | 5 |
| Stearic acid | 3 | 3 |
| Pine tar | 2 | 2 |
| Sulfur | 3 | 3 |
| Mercaptobenzothiazole | 0.75 | 0.75 |
| Acetone-p-amino diphenyl condensation product | 1.0 | 1.0 |

The stocks so compounded were cured by heating in a press at the temperature of 30 pounds of steam pressure per square inch. The modulus and tensile properties of the cured stocks are given below:

*Table I*

| Stock | Cure time in minutes | Modulus of elasticity in lbs./in.$^2$ at elongations of— | | Tensile at break in lbs./in.$^2$ | Ult. elong., per cent |
|---|---|---|---|---|---|
| | | 200% | 400% | | |
| H | 75 | 918 | 2,245 | 3,440 | 580 |
| J | 75 | 693 | 1,985 | 3,660 | 590 |

The cured rubber products were artificially aged by heating in a bomb for 120 and 144 hours at 70° C. under 300 pounds oxygen pressure per square inch. The following results were obtained upon testing the aged rubber products:

Table II

| Stock | Cure time in minutes | Hrs. aged | Modulus of elasticity in lbs./in.² at elongations of— | | Tensile at break in lbs./in.² | Ult. elong., per cent |
|---|---|---|---|---|---|---|
| | | | 200% | 400% | | |
| H | 75 | 120 | 918 | | 1,670 | 390 |
| J | 75 | 120 | 636 | 1,775 | 2,045 | 740 |
| H | 75 | 144 | 870 | 1,590 | 1,590 | 400 |
| J | 75 | 144 | 635 | 1,670 | 1,970 | 475 |

The above data show that the preferred class of materials possess desirable modulus and tensile properties and in addition, afford compositions more resistant to aging than similar compositions prepared from natural rubber.

Again this invention is not limited to the specific examples set forth to illustrate the invention. Other vulcanizable hydrocarbon gums may be employed than those specifically mentioned for this invention is applicable to any vulcanizable natural hydrocarbon gum. That is to say any hydrocarbon gum possessing chemical unsaturation will react in the manner described. These include of course the rubbers obtained from the various Hevea species commonly known as india rubber. Other typical examples suitable for use in the present invention include balata, chicle, guayule, gutta percha, gutta-siak, juleton or pontianac, caucho and Kickxia and Manihot rubbers. It is to be understood therefore that in the attached claims rubber is used in its broad sense to include any vulcanizable natural hydrocarbon gums.

Other inert solvents may be used in the preparation of the preferred materials than those specifically mentioned as well as other Friedel-Crafts catalysts as for example ferric chloride, stannic chloride and the like. Likewise other organic phosphine halides belonging to the aromatic series of compounds may be employed but again, phosphine halides in which a carbon atom of an aromatic radical is attached directly to phosphorus are preferred. Of the latter group of phosphine halides those which contain an aryl radical substituted by at least one lower alkyl group are especially reactive with hydrocarbon gums. It appears that aryl radicals containing alkyl substituents up to about four carbon atoms provide phosphine halides of marked activity. However, as will be appreciated from the foregoing description the invention is by no means limited thereto. Other fillers and compounding ingredients than those shown in the particular compositions described may be utilized and the preferred materials admixed with other plastic or resinous products. This invention is limited solely by the claims attached hereto as part of the present specification.

What is claimed is:

1. A new composition of matter obtained by intimately mixing rubber with an aromatic phosphorus halide where the halogen is selected from a group consisting of chlorine and bromine and is directly attached to the phosphorus atom, the remaining valences on the phosphorus atom being satisfied by an organic radical comprising a closed chain aromatic ring attached to the phosphorus atom through a member of a group consisting of a single bond linked directly to a carbon atom which is a member of said ring, an oxygen atom not a member of the ring, a sulfur atom not a member of the ring, a nitrogen atom not a member of the ring and a methylene group not a member of the ring and heating the mixture at a temperature between about 47° C. and 140° C.

2. A new composition of matter obtained by intimately mixing rubber with an aryl phosphine chloride in which a carbon atom is directly linked to phosphorus and in which at least one chlorine atom is directly linked to phosphorus and heating the mixture at a temperature between about 47° C. and 140° C.

3. A new composition of matter obtained by intimately mixing rubber with an aryl hydrocarbon phosphine dichloride possessing the structure

where R is an aryl hydrocarbon radical and $x$ and $y$ are chlorine and heating the mixture at a temperature between about 47° C. and 140° C.

4. A new composition of matter obtained by intimately mixing rubber with a phenyl phosphine dichloride possessing the structure

where R is a phenyl hydrocarbon radical containing at least one alkyl substituent of not more than four carbon atoms and $x$ and $y$ are chlorine and heating the mixture at a temperature between about 47° C. and 140° C.

5. A new composition of matter obtained by heating rubber with tolyl dichlor phosphine at a temperature between about 47° C. and 140° C.

6. A new composition of matter obtained by heating rubber with crude aryl hydrocarbon chlor phosphines containing aluminum chloride at a temperature between about 47° C. and 140° C.

7. A new composition of matter obtained by heating rubber with crude tolyl dichlor phosphine containing aluminum chloride at a temperature between about 47° C. and 140° C.

8. The method of making a new product which comprises intimately mixing rubber with an aromatic phosphorus halide where the halogen is selected from a group consisting of chlorine and bromine and is directly attached to the phosphorus atom, the remaining valences on the phosphorus atom being satisfied by an organic radical comprising a closed chain aromatic ring attached to the phosphorus atom through a member of a group consisting of a single bond linked directly to a carbon atom which is a member of said ring, an oxygen atom not a member of the ring, a sulfur atom not a member of the ring, a nitrogen atom not a member of the ring and a methylene group not a member of the ring and heating the mixture at a temperature between about 47° C. and 140° C.

9. The method of making a new product which comprises intimately mixing rubber with an aryl phosphine chloride in which a carbon atom is directly linked to phosphorus and in which at least one chlorine atom is directly linked to phosphorus and heating the mixture at a temperature between about 47° C. and 140° C.

10. The method of making a new product which comprises intimately mixing rubber with an aryl hydrocarbon phosphine dichloride possessing the structure

where R is an aryl hydrocarbon radical and $x$ and $y$ are chlorine and heating the mixture at a temperature between about 47° C. and 140° C.

11. The method of making a new product which comprises intimately mixing rubber with a phenyl phosphine dichloride possessing the structure

where R is a phenyl hydrocarbon radical containing at least one alkyl substituent of not more than four carbon atoms and $x$ and $y$ are chlorine and heating the mixture at a temperature between about 47° C. and 140° C.

12. The method of making a new product which comprises heating rubber with tolyl dichlor phosphine at a temperature between about 47° C. and 140° C.

13. The method of making a new product which comprises heating rubber with crude aryl hydrocarbon chlor phosphines containing aluminum chloride at a temperature between about 47° C. and 140° C.

14. The method of making a new product which comprises heating rubber with crude tolyl dichlor phosphine containing aluminum chloride at a temperature between about 47° C. and 140° C.

15. A very tough plastic rubber derivative containing at least twenty parts non-rubber constituents per hundred parts rubber and sulfur vulcanizable to semi-hard rubber with about three parts sulfur by weight, obtained by heating rubber with crude aryl phosphine chlorides containing aluminum chloride at a temperature between about 47° C. and 140° C.

16. A very tough plastic rubber derivative containing about thirty parts non-rubber constituents per hundred of rubber and sulfur vulcanizable to semi-hard rubber with about three parts sulfur by weight, obtained by masticating rubber at substantially 100° C. with a crude phenyl hydrocarbon phosphine chloride containing aluminum chloride, wherein the phenyl radical contains at least one methyl substituent.

17. The process of making a tough plastic rubber derivative which comprises masticating rubber at substantially 100° C. with a crude phenyl hydrocarbon phosphine chloride containing aluminum chloride, wherein the phenyl radical contains at least one methyl substituent.

18. A new composition of matter obtained by heating rubber with xylyl phosphine dichloride at a temperature between about 47° C. and 140° C.

GEORGE D. MARTIN.